United States Patent [19]
April et al.

[11] Patent Number: 5,443,428
[45] Date of Patent: Aug. 22, 1995

[54] GEARLESS MECHANICAL TRANSMISSION

[75] Inventors: Edward April; Martin April, both of Mystic, Conn.

[73] Assignee: April Engineering Corporation, Mystic, Conn.

[21] Appl. No.: 235,356

[22] Filed: Apr. 29, 1994

[51] Int. Cl.6 ............................................. F16H 23/00
[52] U.S. Cl. ...................................... 475/163; 475/165
[58] Field of Search ........................ 475/163, 165, 197

[56] References Cited

U.S. PATENT DOCUMENTS

| | | | |
|---|---|---|---|
| 4,563,915 | 1/1986 | Tibbals | 74/800 |
| 4,620,456 | 11/1986 | Distin et al. | 74/800 |
| 4,620,567 | 11/1986 | Distin et al. | 74/800 |
| 4,715,249 | 12/1987 | Tibbals, Jr. | 475/163 |
| 4,829,851 | 5/1989 | Imase | 74/798 |
| 4,841,809 | 6/1989 | Jolly | 475/163 |

FOREIGN PATENT DOCUMENTS 2085994 5/1982 United Kingdom .

*Primary Examiner*—Dirk Wright
*Attorney, Agent, or Firm*—Gifford, Krass, Groh, Sprinkle, Patmore, Anderson & Citkowski

[57]  ABSTRACT

A gearless mechanical transmission includes a housing which supports a high-speed shaft and a low-speed shaft along a main rotational axis. The housing also includes a precession link therein fixed for rotation about the high-speed shaft at an angle skewed with regard to the main rotational axis. A first cam surface is associated with the housing, a second cam surface with the low-speed shaft and a third and fourth cam surface with a precession link. Cam follower elements include rollers which establish rolling contact between the first and third and second and fourth cams respectively.

11 Claims, 4 Drawing Sheets

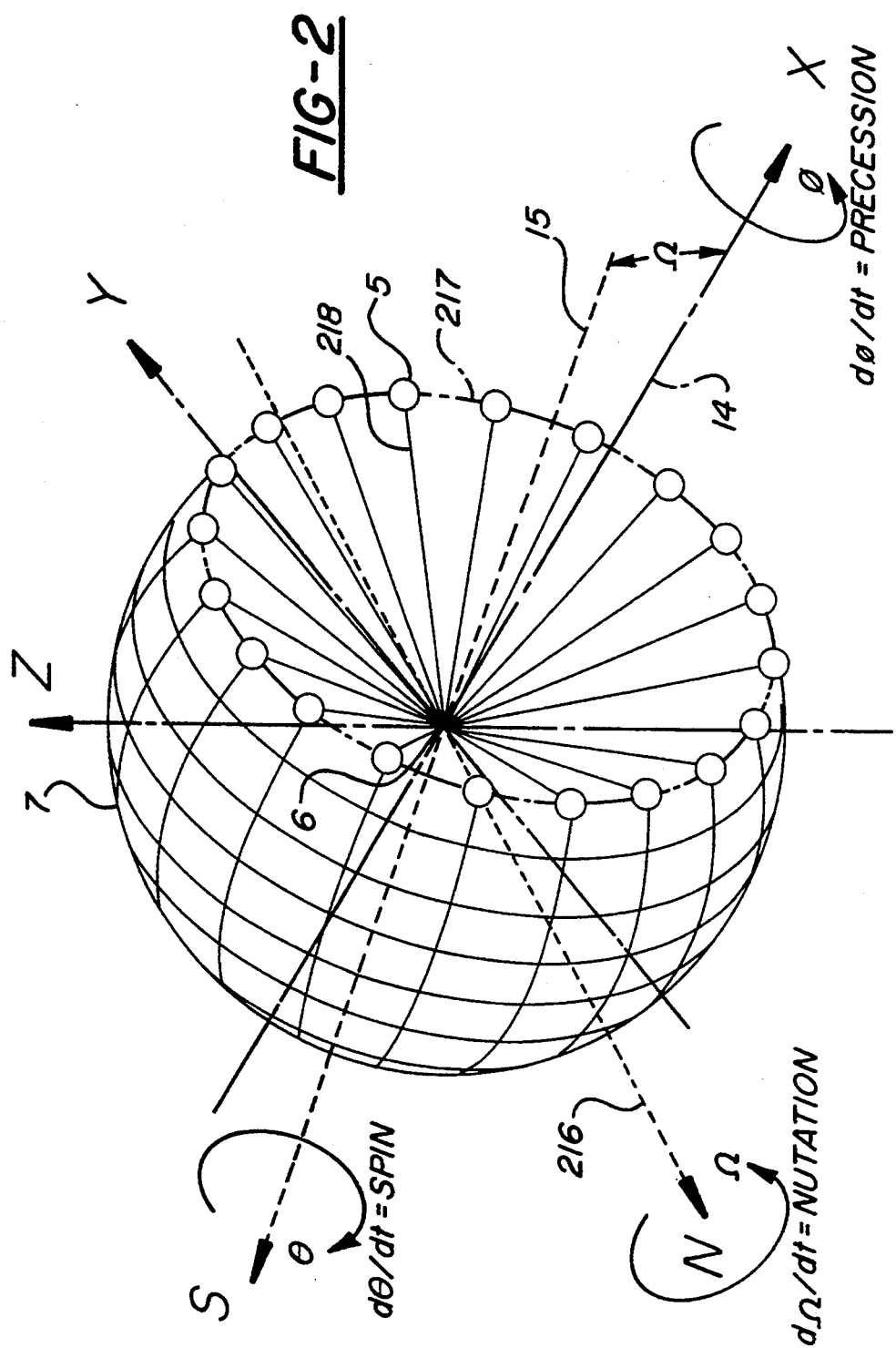

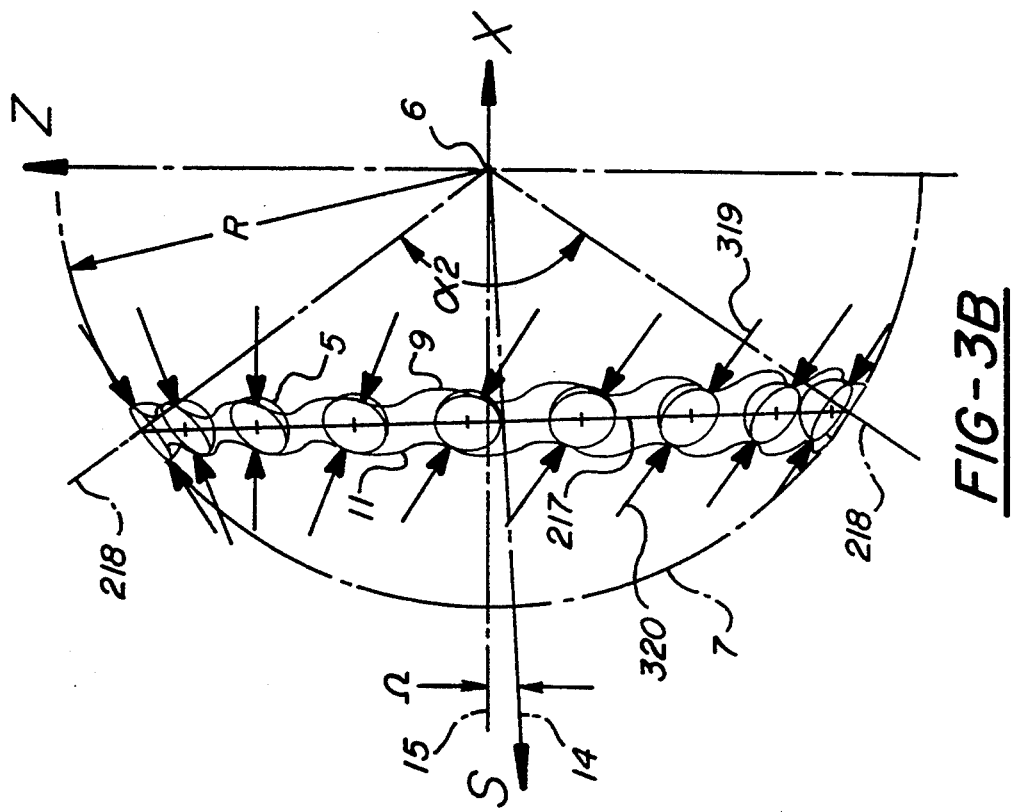
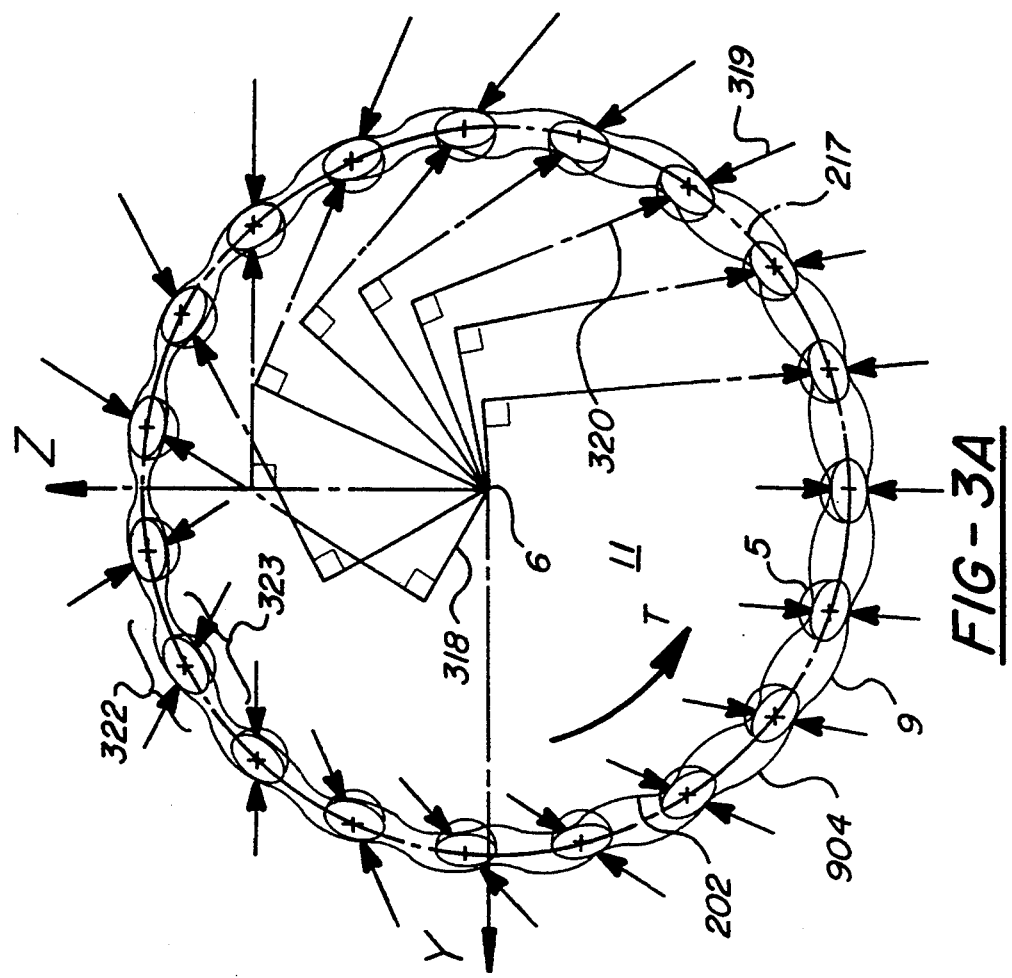

GEARLESS MECHANICAL TRANSMISSION

FIELD OF THE INVENTION

This invention relates generally to transmissions of the type which convert one rate of rotation to another. More specifically, the invention relates to a gearless mechanical transmission in which cam and follower elements interact to effect a speed change.

BACKGROUND OF THE INVENTION

Frequently, it is necessary to convert the rate of rotation of a shaft from one value to another and various mechanical transmissions have been developed to do so. Shafts, bearings, housings, skewed journals, cams, roller followers, radially acting springs and wobble members such as nutating idlers, swash plates and the like, are all fundamental machine elements that have been combined in many different transmission assemblies known in the prior art. For example, circular arrays of rollers are shown in U.S. Pat. Nos. 1,277,193; 1,444,717; 1,634,453; 4,620,456 and 4,620,457, to transmit torque between two engaging surfaces. The invention disclosed herein represents a new combination of fundamental machine elements operating under unique conditions to provide a transmission which secures advantages not attainable by the prior art.

Many prior art transmission systems employ gears and the like to effect a speed reduction. In two-element gearing, relatively few engaging teeth transmit torque loads through contacts that slide as they roll, thereby creating problems of inefficiency, cogging, backlash and noise. Attempts have been made in the prior art to employ three element engaging systems in order to distribute the torque load over a relatively larger number of contacts and reduce shaft velocity variations. The present invention also employs a three element engaging system, except that it is purposely designed to have rolling and not sliding contact, thus avoiding frictional forces that reduce the efficiency of prior art shaft speed reducers. Many of the prior art three element, speed-reducer devices employ rollers as a third element for transmitting torque between two engaging elements; however, such devices can not achieve high efficiencies because the design thereof includes engaging surfaces that force the rollers to slide as well as roll. While the present invention includes rollers in connection with the third element, it is purposely designed so that the various engaging elements thereof all include spherically-directed surfaces which do not force the rollers to slide as they roll, and thereby avoid frictional losses inherent in prior art shaft speed reducers.

In order for a three element engaging system to conjugate, each of the three engaging elements must have their axes offset from each other. One method of achieving an appropriate offset is to translate the axes a fixed distance from each other. U.S. Pat. No. 4,829,851 shows a three element shaft speed reducer in which axes of the elements are parallel, but not co-linear, thus producing epicyclic motions. However, epicyclic motions have undesirable translational accelerations and decelerations which cause vibrations and require counterbalancing masses to achieve dynamic balance. The only other method of offsetting the axes is to align them at an angle to each other. A number of prior art speed reducers employ angled elements described as experiencing the motion of nutation. See, for example, U.S. Pat. Nos. 3,590,659; 3,640,154; 4,620,456 and 4,620,457. As defined in the art, nutation is a result of changing angles of offset. However, it is undesirable to change the angle of the engaging element's offset axis, because at high-speed, dynamic imbalance will be induced by the angular accelerations and decelerations as the offset angle changes, leading to wear, noise and vibration problems.

In accord with the present invention, the axes of the engaging elements are offset relative to one another, except that they are purposely designed to maintain a constant offset angle and are not subject to vibration induced by the motion of nutation claimed in prior art shaft speed reducers.

U.S. Pat. No. 4,563,915 discloses a shaft speed reducer which includes what is described as a wobble member, which has a cam element associated therewith having axially directed cam lobes. The patent further discloses that the lobes engage rollers which are constrained to move along the surface of an imaginary sphere; however, since the crests of the axially directed cam lobes are at a slightly greater distance from the center of the imaginary sphere than the valleys, and since the rollers are at a fixed distance, the rollers will be forced to disengage and reengage with the cam surface causing wear, noise and undesirable reciprocating forces. Alternatively, if the rollers cannot disengage and reengage, then they must deviate from the spherical alignment causing them to bind against the roller support assembly.

U.S. Pat. Nos. 4,220,457 and 4,620,456 disclose three element speed reducer assemblies which include roller elements constrained to travel in an axially undulating, hypotrochoidal or hypocycloidal path and to engage correspondingly trochoidally or epicycloidally configured members. These elements produce sharp changes in velocity and displacement leading to noise, wear and inefficiencies.

Most of the prior art shaft speed reducer patents refer to the three element engaging system using gear terminology, but the invention disclosed herein is a gearless mechanical transmission, and only cam terminology can realistically describe the assembly of rollers within a cage as the follower element, and the engaging surfaces as spherically directed multi-lobed cams. Only with respect to the calculation of the shaft speed ratios are the number of lobes on a cam element somewhat analogous to the number of teeth on a gear. The engaging surfaces will henceforth be referred to as spherically directed multi-lobed cams.

The design of the spherically directed multi-lobed cams are extremely critical for efficient operation with zero backlash, and prior art shaft speed reducer patents fail to properly address how to design engaging surfaces to eliminate sliding friction. The invention disclosed herein illustrates and describes the critical pitch path of the spherically directed multi-lobed cams so that the follower is directed to roll without sliding.

The present invention employs engaging elements with undulating surfaces, but the surfaces are all designed to be spherically directed so that only angular displacement of the various elements is encountered thus avoiding translational vibrations as well as disengagement and reengagement problems associated with prior art shaft speed reducers. The transmission of the present invention eliminates sliding contact thereby minimizing frictional losses, binding and other sources of inefficiency, wear and noise. In general, prior art mechanical transmission devices describe the various shafts as being input or drive shafts and output or driven shafts. This is because their inefficiencies are so great they cannot be utilized in a reverse manner as a speed increaser by driving the output shaft at a high ratio. The mechanical losses in the present invention are so low that it can also function as a high ratio speed increaser; therefore, in the context of the present disclosure, the shafts of the transmission will be described in terms of high-speed shafts and low-speed shafts rather than as input shafts and output shafts.

It will thus be appreciated that the present invention provides a gearless mechanical transmission which can function to increase or decrease shaft speed rotation. The transmission is quiet, efficient and capable of transmitting large amounts of power. Furthermore, the transmission is economical to manufacture since it can be assembled within economically achievable tolerances, and toward that end the present invention further includes a tolerance compensator which will be described in greater detail hereinbelow.

SUMMARY OF THE INVENTION

There is disclosed herein a gearless mechanical transmission. The transmission includes a housing which has a first cam element having a plurality of smoothly undulating, spherically directed lobes. The transmission includes a high-speed shaft and a low-speed shaft which are supported by the housing for rotation about the main rotational axis. The low-speed shaft includes a second cam element associated therewith which also has a plurality of smoothly undulating, spherically directed lobes. The transmission includes a precession link supported by the high-speed shaft for a rotation thereabout on a skew axis which is angularly displaced from the main rotational axis and which intersects the main rotational axis at a point P. A third and a fourth cam element are each associated with the precession link and each includes a respective plurality of smoothly undulating, spherically directed lobes. The transmission further includes a first and a second cam follower element, each having a cage supporting a plurality of rollers. The first cam follower element and the first cam and third cam element are disposed so that each roller of the first follower element simultaneously and continuously contacts the first and third cam elements along the surface of the pitch sphere having its center at the point P. The second cam follower and the second and fourth cam elements are also disposed so that each roller of the second follower element simultaneously and continuously contacts the second and fourth cam elements along the surface of the pitch sphere centered at the point P.

In all embodiments the roller contact path length for one lobe of the first cam and the roller contact path length for one lobe of the third cam are equal and the roller contact path length for one lobe of the second cam and the roller contact path length for one lobe of the fourth cam are equal.

In particular embodiments, the precession link is supported by a precession bearing, and the transmission may include a tolerance compensator which comprises a radially acting spring element disposed between the precession bearing and the precession link.

BRIEF DESCRIPTION OF THE DRAWINGS

FIG. 2 is a depiction of a spherical coordinate system for analyzing the motion of the various components of the transmission of the present invention;

FIG. 3a is a spherically truncated, end view of two of the cams, and a follower assembly of the transmission, illustrating torque loading of the elements thereof;

FIG. 3b is a spherically truncated, side view of the cams and roller assembly of FIG. 3a;

FIG,. 4c is a cross-sectional view of a portion of a cam follower assembly including spherical, rollers.

DETAILED DESCRIPTION OF THE INVENTION

The present invention comprises a gearless mechanical transmission which is efficient, economical, compact, light weight, accurate, low vibration, non-cogging and low noise and can be operated to reduce or increase speed and torque. In the present invention, torque is transmitted by rolling elements and efficiency is similar to that of anti-friction bearings. And since, as will be described in greater detail below, the contact path lengths for engaging cam lobes are equal, sliding friction is minimized. Because of its low thermal loss and the fact that torque is distributed over a large portion of each element, the transmission can be made small in size. The fact that various elements thereof are in continuous contact eliminates backlash and noise. Since only angular rotation occurs, vibration is minimized and the result of having the load distributed over a large portion of each element mitigates the effects of geometric variables and manufacturing tolerances, thereby minimizing cogging.

Figure 1:
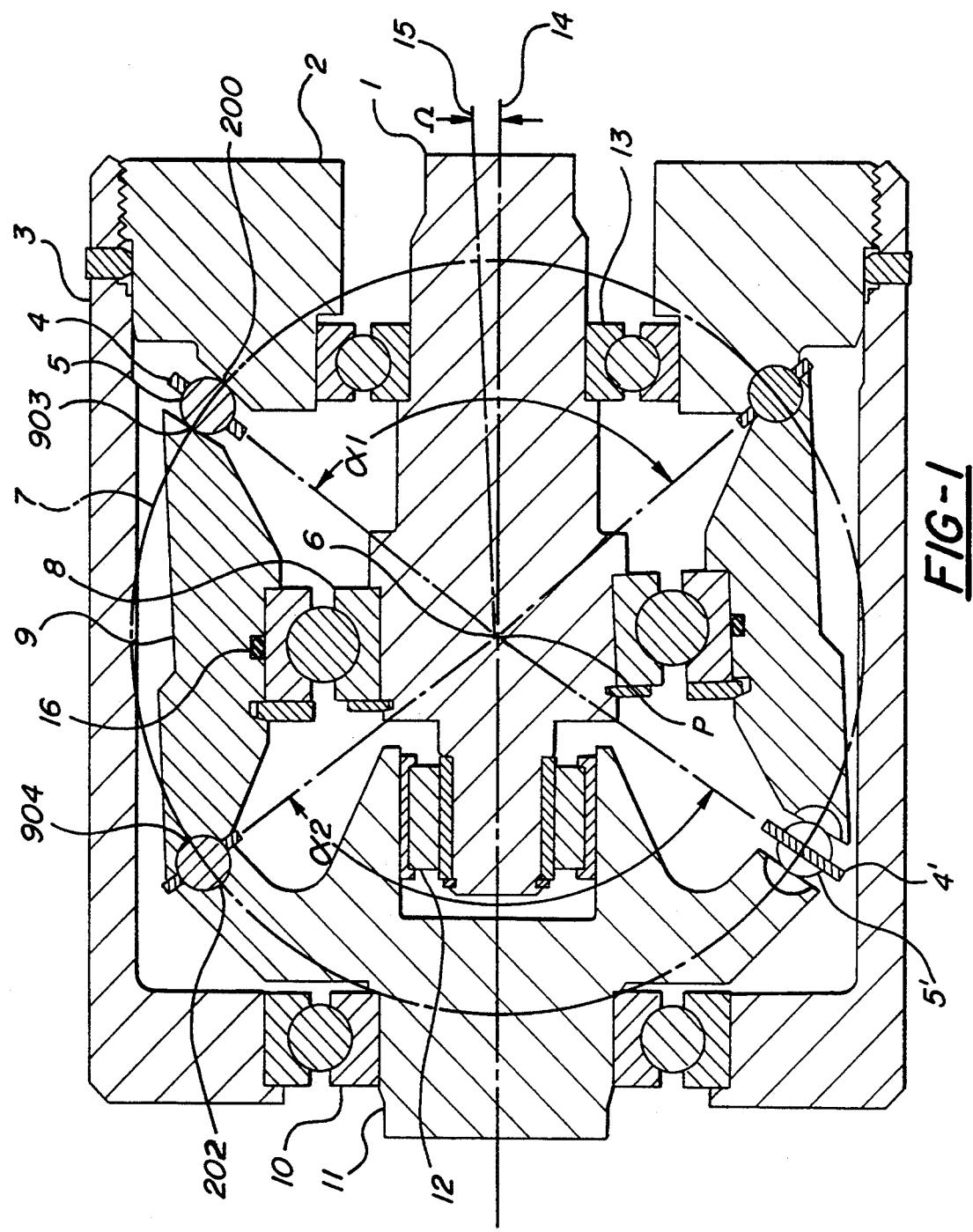
FIG. 1 is a cross-sectional view of one embodiment of transmission structured in accord with the principles of the present invention.

Referring now to FIG. 1, there is shown one embodiment of transmission structured in accord with the principles of the present invention. The axis of symmetry for the high-speed shaft 1, low-speed shaft 11, housing 3, and housing end-cap element 2 are all coaxial to the main rotational axis 14 of the transmission. The housing end cap element 2 is installed into the open end of the housing 3 and fixed from rotating or translating with respect to the housing 3. Housing 3 has an internal journal which includes a low-speed bearing 10 and is configured to allow clearance for all of the closed parts to operate without interference. The housing end cap element 2 has an internal journal which supports the high-speed bearing 13 and a spherically-directed multi-lobed cam surface 200. The cam surface 200 is smoothly undulating; and within the context of this disclosure, a smoothly undulating surface is a surface in which the slope thereof varies in a manner devoid of abrupt transitions or discontinuities. Smoothly undulating surfaces include, but are not limited to, sinusoidally varying surfaces as well as surfaces which vary in an approximately sinusoidal manner. The cam surface 200 engages a first follower element comprised of a plurality of rollers 5 equally spaced within a conic-circular cage 4.

The transmission includes the precession link 9 which has an internal bore configured to support the precession bearing 8 and the tolerance compensator 16. The precession link 9 includes a third and a fourth cam surface 903,904 at either end thereof. The third cam surface 903 engages the first cam surface 200 through a first follower element 4 and the fourth cam surface 904 engages a second cam surface 202, on the low-speed shaft 11, through a second follower element 4'.

The high-speed shaft 1, has a coaxial external journal which supports the high-speed bearing 13 and another coaxial external journal which supports a coaxial bearing 12, all of which are concentric to the main rotational axis 14 of the transmission. The high-speed shaft 1 also includes a skewed journal which supports the precession bearing 8, in alignment with a skew axis 15, and it will be noted that the precession link 9 is disposed to rotate about the skew axis 15 of the high-speed shaft 1 which angularly intersects the main rotational axis 14 at a point P. As mentioned above, the elements of the transmission do not undergo any translational motion, that is to say they do not move away from, or toward, point P when the transmission is operated. All of the moving elements of the transmission experience only angular motion about point P.

This particular arrangement of parts produces a two-stage speed change because it has two sets of engaging elements. By varying the number of lobes in the cams, a number of transmissions can be designed having different speed change ratios in accord with the following equation:

$$\frac{\text{High speed shaft revolutions}}{\text{Low speed shaft revolutions}} = \frac{1}{1 - \left(\frac{L_1 \times L_3}{L_2 \times L_4}\right)}$$

The variables of the equation are: L1 equals the number of lobes on cam 200; L2 equals the number of lobes on cam 903; L3 equals the number of lobes on cam 904 and L4 equals the number of lobes on cam 202.

FIG. 2 illustrates the coordinate system that defines the six degrees of freedom used to completely describe the motion of any mass. The X, Y, & Z axes are used to describe the three components of translational motion and the X, N, & S axes are used to describe the three components of angular motion. The X axis is designated as the main rotational axis 14 of the transmission, the S axis is designated as the skew axis 15 of an individual part within the transmission, and the N axis is designated as a nutation axis 216 of an individual part within the transmission. Since the invention disclosed herein is purposely designed not to have any parts that translate with respect to the housing 3, then only the angular velocities need to be analyzed. The angular velocity of any mass is composed of the following three components; precession about the main rotational axis 14, nutation about it's nutation axis 216, and spin about it's own skew axis 15. The precession component is the rotational speed of an individual part's skew axis about the main rotational axis 14. The nutation component is the rotational speed of the skew axis 15 about an axis 216 perpendicular to and rotating with the main rotational axis 14. The spin component is the rotational speed about the object's own skew axis 15. All axes shown in FIG. 2 pass through the common apex 6 that corresponds to point P in FIG. 1 and serves as the origin for the pitch sphere 7.

The earth's rotation is analogous to spin, the changing angle of the earth's pole is analogous to nutation, and the elliptical circuit that the earth's poles travel is analogous to precession. The motion of nutation is not present when the skewed axis 15 envelopes a conic volume of revolution with circular transverse cross-sections as it precesses about the main axis 14, indicating that the skew angle Omega is not varying. The motion of nutation is present only when the skewed axis 15 envelopes a volume with non-circular transverse cross-sections as it precesses about the main axis 14, indicating that the skew angle Omega is varying and the body is experiencing an external forcing function.

FIG. 2 also illustrates how to describe the alignment of the rollers 5 within a cam follower element. A pitch cone is defined by a series of spherically radial lines 218 that radiate out frown the common apex 6 to the centers of the rollers 5 located on the pitch sphere 7. The pitch circle 217 is at the intersection of the pitch cone with the pitch sphere 7 and the centers of the rollers 5 are equally spaced on that pitch circle 217 that lies in a plane that is perpendicular to the S axis.

The embodiment of the invention disclosed herein can be configured in three different ways by fixing one of the following elements from rotating: the housing, the high-speed shaft, or the low-speed shaft. Each of the three configurations can function as a speed reducer or a speed increaser depending upon which of the two rotating elements is operated as the input.

For example, the embodiment shown in FIG. 1 can be operated as a speed reducer by driving the high-speed shaft 1 and fixing the housing, making the low-speed shaft operate as the output. The motion analysis of this configuration begins with the high-speed shaft 1 rotating about the main axis 14, thus precessing the axis of its skewed journal at a fixed skew angle Omega. The skewed journal imparts the same precessing motion to the precession link 9 through the anti-friction bearing 8. Each time the precession link precesses 360 degrees about the main axis 14, its spherically directed multi-lobed cam surfaces 903, 904 cause two follower elements, each comprised of rollers 5 and cage 4, to rotate from one lobe to the next. The two follower elements rotate about their own skew axes that is set at one half of the angle of the skew journal on the high-speed shaft 1. The skew axes of the two follower elements also precess about the main axis 14 at an angular velocity that differs from that of the spherically directed multi-lobed cam elements on the housing element 2 and the low-speed shaft 9. The spherically directed multi-lobed cam element on the housing end cap element 2 is required to provide a resisting torque from the housing 3 and foundation. The spherically directed multi-lobed cam element on the low-speed shaft is required to provide a method of extracting torque from the transmission.

The motion analysis for the previous configuration operating as a speed increaser logically flows backward, by driving the rotation of the low-speed shaft so that the high-speed shaft is driven through its skewed journal. The above motion analysis is typical for the remaining two configurations as speed reducers and speed increasers.

FIGS. 3a and 3b illustrate how a typical pair of cams, for example 202, 904, would appear if they were truncated at the pitch sphere 7. The pitch path of the precession link 9 has two more lobes than the pitch path of the low-speed shaft 11. The profiles for the spherically directed pitch paths of the conjugating lobes 322 and 323 are generated by using a computer to animate a full 360 degree precession of an accurate three dimensional solid model of the cam follower element without the cage. The three dimensional path that the center of a roller makes on the pitch sphere as the follower element precesses 360 degrees is used to generate the tool paths for machining the spherically directed multi-lobed cam surfaces with cutting bits that remove the material occupying the space that the rollers travel through. The shape of the lobes are purposely designed to be smoothly undulating, mathematically "clean," spherically directed without sharp cusps or other geometric discontinuities. Each individual lobe on the spherical pitch path of the precession link 9 has a three dimensional peak to peak length 322 that is equal to the three dimensional peak to peak length 323 of an individual lobe on the spherical pitch path of the low-speed shaft 11.

FIGS. 3a and 3b assume that the roller contacts with the cam surface precisely at the pitch sphere. Since, axial thrust due to torque and housing pre-load may force the roller contacts onto concentric imaginary spheres that are slightly offset from the theoretical pitch sphere, the three dimensional contact paths are designed on the surfaces of the offset spheres. The cone angle, Alpha 2, is varied through a series of computer iterations to calculate the precise angle that will make the spherically directed contact paths of the conjugating lobes 322 and 323 equal in length. The multi-lobed cam surfaces are purposely designed so that the actual contact path lengths are equal in order to minimize undesirable roller slippage and thus avoid all the inefficiencies, wear, noise, and heat related to friction.

The three dimensional shapes for lobes 322 and 323 are a function of the number and spacing of the rollers within the follower. For any given number of rollers, the spaces between the rollers are varied by either changing the size of the pitch sphere or the size of the roller. As the space between the rollers is reduced, the shape of the lobes becomes steeper and their ability to transmit torque also increases. The minimum space between the rollers, required for the strength of the follower's cage material, sets a natural limit for steepness. The wavelength of the approximately sinusoidal, spherically directed contact path increases as the roller spacing increases.

Figure 4B:
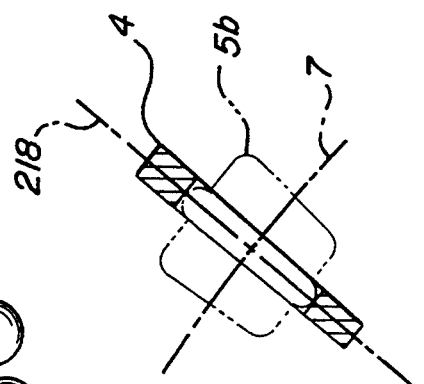
FIG. 4b is an isometric view of a series of rollers as disposed to engage a portion of a cam.
Figure 4D:
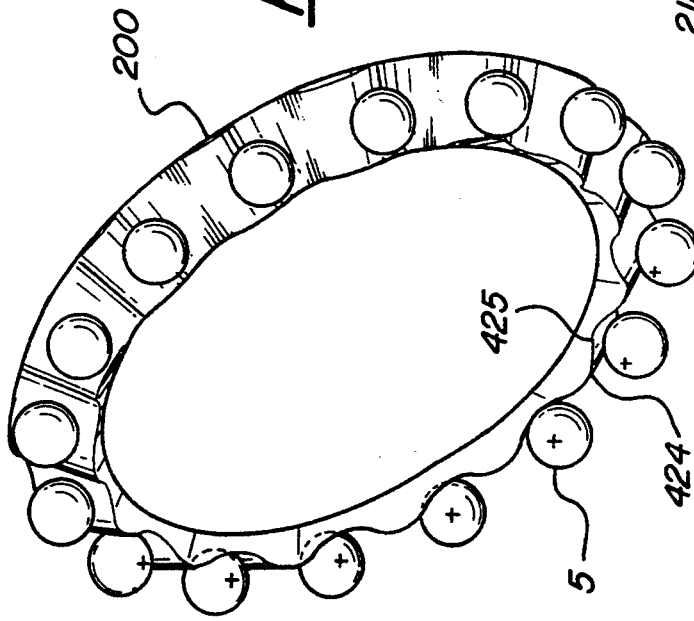
FIG. 4d is a cross-sectional view of a portion of a cam follower assembly including tapered roller bearings therein.

The three dimensional shapes for lobes 322 and 323 are also a function of the skew angle, Omega. FIGS. 4c and 4d show cross-sections of rollers within the follower element cage and the theoretical maximum skew angle is calculated by drawing a line from the roller's contact point on the cam surfaces down to the common apex point P and back up to the nearest conic face of the cage. The skew angle that is actually employed is smaller than the theoretical maximum skew angle, because of manufacturing tolerances and the need to keep a clearance between the cage and the peaks of the lobes. The amplitude of the substantially sinusoidal spherically directed contact path increases as the skew angle increases.

FIG. 3a also illustrates how the torque T that is applied through the spherically directed multi-lobed cam surface of the precession link 9, is distributed into many smaller forces 319 that pass through the centers of the rollers 5 and are resisted by equal and opposite forces 320 exerted by the spherically directed multi-lobed cam surface 202 of the low-speed shaft 11. The forces 319 and 320 all act tangent to the pitch sphere 7 and perpendicular to the pitch paths 9 and 11 at the contact points of the rollers 5. The moment arms 318 determine how much of the total torque 321 that each contact point shares and the axial thrust forces of loads 319 and 320 are shown in FIG. 3b. In general, it is desirable that the cams and followers be configured so that at any instant the total torque load is borne by at least one-third of the rollers. FIG. 3b also illustrates the equally spaced alignment of the rollers on a pitch circle 217 defined by the intersection of a cone 218 with an apex angle of Alpha 2 and the pitch sphere.

Figure 4A:
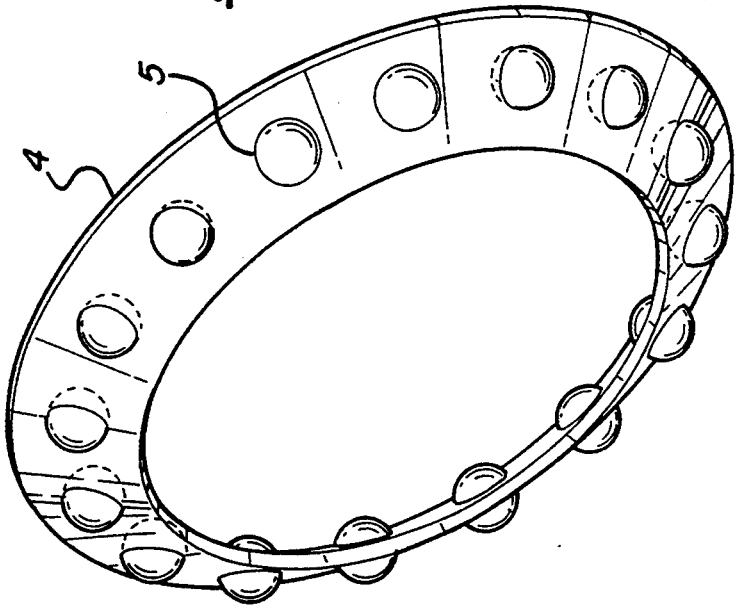
FIG. 4a is an isometric view of one embodiment of cam follower assembly.
Figure 4C:
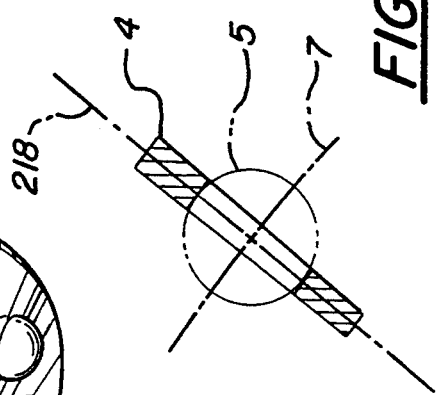

FIG. 4a illustrates one embodiment of follower element which comprises a plurality of equally spaced rollers 5 assembled within a conic-cage 4. The cage 4 is merely intended to keep the rollers 5 aligned in a circular array and it is not meant to be a load carrying member. The cage's wide faces are conic surfaces that converge at the common apex (6 in FIG. 2). FIG. 4b illustrates how the rollers 5 engage with the spherically directed multi-lobed cam surface 200. The lobe peaks 424 and the lobe troughs 425 are also evenly spaced with conic surfaces that align with the common apex 6. FIG. 4c illustrates the most common embodiment of a roller 5 as a spherical ball. FIG. 4d illustrates an alternative embodiment of a roller 5b as a conical wheel.

A specific transmission was built in accord with the foregoing drawings. The transmission was approximately 5.5 inches in diameter by 8 inches long and it produced a speed reduction ratio of 51 to 1. When the high-speed shaft 1 was driven by an electric motor or the like at a high rotational rate, a low-speed high torque output was delivered to low-speed shaft 11. It was also found that the low-speed shaft 11 could be easily turned by hand so as to rotate the high-speed shaft 1 at a high rate of rotation. In the specific embodiment, the skew angle, Omega, was 3.042 degrees from the main rotational axis 14, and each revolution of the high-speed shaft 1 caused the skew axis 15 of the precession bearing 8 to revolve once about the main rotational axis 14 which forced the skew axis 15 of the precession link to also revolve once about the main rotational axis 14. The precession bearing 8 allowed the precession link 9 to rotate freely about the skewed axis 15 as the skewed axis 15 simultaneously rotated about the main rotational axis 14.

The precession link 9 was fabricated from steel and had a third cam track 903 with seventeen lobes machined into the end that interfaces with the housing end cap element 2 which had a cam track 200 with fifteen lobes. The follower element between the two included sixteen spherical balls 0.3750 inches in diameter retained in a cage 4 that had sixteen equally spaced holes that were 0.3754 inches in diameter. Alpha 1, the cone angle of the sixteen roller follower element was chosen to be 101.192 degrees so that the pitch path length for one lobe (i.e., the single lobe contact path), of the seventeen lobe cam track was equal to the pitch path length for one lobe of the fifteen lobe cam track in the housing element 2. The fourth cam track 904 has twenty lobes and it engaged the second cam track 202 associated with the low-speed shaft 11, which has eighteen lobes. Engagement was via a follower element which included nineteen spherical balls retained in a cage as previously described.

The twenty lobe cam track of the precession link 9 conjugates with a roller follower element that is comprised of nineteen spherical balls that are 0.3750 inches in diameter and contained in a cage that has nineteen equally spaced holes that are 0.3754 inches in diameter. Alpha 2, the cone angle of the nineteen roller follower element was chosen to be 110.644 degrees so that the pitch path length of one lobe of the twenty lobe cam track was equal to the pitch path length for one lobe of the eighteen lobe cam track that is machined into the low-speed shaft 11.

All of the cam tracks were designed so that their pitch paths were always on the pitch sphere 7, which in the case of this particular embodiment had a diameter of 4.940 inches. The cam tracks, the journal supporting the precession bearing 8, the groove for the tolerance compensator 16 and the groove for the snap ring that retains the precession bearing 8 were all machined to be concentric with the skew axis 15. All of the interfacing cam tracks had equal single lobe pitch path lengths so that the rollers could roll without sliding. The cages were designed so that the centers of the balls were constantly located on the pitch sphere 7. It was found that the cages could be machined from steel, brass and fiber reinforced thermoplastic, with superior performance of the plastic cages indicating that the cages are not load carrying members. Steel, ceramic and plastic balls have all been successfully used as rollers.

In assembling the device, the housing end cap element 2 was threaded into the steel housing 3 until the proper axial alignment of the assembly was achieved where each of the thirty-five rollers 5 were in contact with both of their interfacing cam tracks and at that time set screws were used to prevent the housing 3 and the end cap element 2 from rotation with respect to one another.

Each revolution of the precession link's skew axis 15 causes the entire sixteen ball follower element to revolve so that the balls 5 roll off of one lobe of the housing end cap element 2 to the next lobe. At the same time, the balls 5 of the follower element are also rolling from one lobe of the precession link 9 to the next lobe causing the precession link 9 to revolve $1-(15/17)=0.117$ revolutions about its skewed axis 15 for each revolution of the high-speed shaft 1. All of the balls 5 in all of the follower elements simultaneously maintain continuous contact with both interfacing cam tracks.

The nineteen ball follower element conjugates with the eighteen lobe cam track on a low-speed shaft 11. As the precession link 9 revolves about its skewed axis 15, while that skewed axis 15 is simultaneously rotating about the main rotational axis 14, the balls of the nineteen roller follower element are forced to roll from one lobe of the twenty lobe cam track on the precession link 9 onto the next lobe, causing the entire nineteen ball follower element to revolve. At the same time, the balls 5 are also rolling from one lobe of the eighteen lobe cam track on the low-speed shaft 11 to the next lobe forcing the low-speed shaft 11 to rotate $1-(15/17\times20/18)=0.019$ revolutions about the main axis 14 for each revolution of the high-speed shaft 1.

When the above-described prototype was operated with heavy grease for lubrication, its efficiency and overall performance was degraded from when it was operated without lubrication or lightly lubricated, thus proving that the rollers 5 were rolling and not sliding. The prototype did not generate heat when it was operated for extended time periods at high rates of rotation under load, thus providing yet more proof that the rollers were rolling and not sliding. Operation of the prototype was silent indicating that the rollers never experienced the impacts caused by disengagement and re-engagement.

The foregoing example is merely illustrative of one embodiment of the present invention. Clearly, by varying the number, size and shape of the lobes, as well as the angle of the skew axis, a number of different reduction ratios may be achieved. The device of the present invention may be fabricated from a number of materials and in a variety of sizes, depending upon operational parameters. In view of the foregoing, it will be appreciated that the foregoing discussion, description and examples are merely illustrative of embodiments of the present invention and not limitations upon the practice thereof. It is the following claims, including all equivalents, which define the scope of the invention.

We claim:

1. A gearless mechanical transmission comprising:
  a housing having a first cam element therein, said first cam element including a first plurality of identical, smoothly undulating, spherically directed lobes;
  a high-speed shaft supported by said housing for rotation about a main rotational axis, and including a skewed journal thereupon, said skewed journal defining a skew axis which is displaced at a fixed angle from said main axis and which intersects said main axis at a point P;
  a low-speed shaft supported by said housing for rotation about said main rotational axis, said low speed shaft including a second cam element having a second plurality of identical, smoothly undulating, spherically directed lobes;
  a precession link rotatably supported by a bearing which engages the skewed journal of said high-speed shaft so that said link rotates thereabout on said skew axis, said precession link including a third cam element having a third plurality of identical, smoothly-undulating, spherically directed lobes which are two greater in number than the first plurality of lobes, and a fourth cam element having a fourth plurality of identical, smoothly-undulating, spherically directed lobes, which are two greater in number than the second plurality of lobes;
  a first cam follower element which includes a cage supporting a first plurality of rollers which is one greater in number than the first plurality of lobes;
  a second cam follower element which includes a cage supporting a second plurality of rollers which is one greater in number than the second plurality of lobes;
  wherein said first cam follower element is disposed between the first and third cam elements so that every roller of said first cam follower element is simultaneously and continuously in contact with the surfaces of one of said first plurality of lobes and one of said third plurality of lobes, such that both single lobe contact paths are spherically directed and have the same three dimensional length; and said second cam follower element is disposed between the second and fourth cam elements so that every roller of said second cam follower element is simultaneously and continuously in contact with the surfaces of one of said second plurality of lobes and one of said fourth plurality of lobes such that both single lobe contact paths are spherically directed and have the same three dimensional length; wherein all moving elements of said transmission have only angular velocity, and no element experiences reciprocating, translational motion with respect to any other fixed or moving element of said transmission; and wherein, at any given instant, at least one-third of the rollers of each of said first and second cam follower elements share a torque load imposed between the high speed shaft and the low speed shaft and wherein the rotational velocity of said low speed shaft is always a direct, fixed ratio of the rotational velocity of said high speed shaft.

2. A transmission as in claim 1, further including a tolerance compensator comprising a radially acting spring element disposed between the precession link and the bearing.

3. A transmission as in claim 1, wherein the rolling elements of said first cam follower and said second cam follower comprise spherical balls within a retainer cage that provides guidance for their alignment.

4. A transmission as in claim 1, wherein the first cam follower element and the second cam follower element comprise a plurality of conical rollers supported in a retaining cage that provides guidance for their alignment.

5. A transmission as in claim 1, wherein said high speed shaft is a power input shaft, the housing is immobilized so as to prevent it from rotating and the low speed shaft is a power output shaft and wherein said transmission is operative as a speed reducer.

6. A transmission as in claim 1, wherein the high speed shaft is a power output shaft, the housing is immobilized so as to prevent it from rotating, and the low speed shaft is a power input shaft, and wherein the transmission is operative as a speed increaser.

7. A transmission as in claim 1, wherein the high speed shaft is a power input shaft, the housing is free to rotate and operates as a power output and the low speed shaft is immobilized so as to prevent it from rotating, and wherein said transmission is operative as a speed reducer.

8. A transmission as in claim 1, wherein the high speed shaft is a power output shaft, the housing is free to rotate and operates as a power input and the low speed shaft is immobilized, and wherein said transmission is operative as a speed increaser.

9. A transmission as in claim 1, wherein the high speed shaft is immobilized, the housing is free to rotate and operates as a power output, and the low speed shaft is a power input shaft, and wherein said transmission is operative as a speed reducer.

10. A transmission as in claim 1, wherein the high speed shaft is immobilized, the housing is free to rotate and operates as a power input and the low speed shaft is a power output shaft, and wherein said transmission is operative as a speed increaser.

11. A gearless mechanical transmission comprising:
a housing having a first cam element therein, said first cam element including a first plurality of smoothly undulating, spherically directed lobes;
a high-speed shaft supported by said housing for rotation about a main rotational axis;
a low-speed shaft supported by said housing for rotation about said main rotational axis;
a second cam element associated with said low-speed shaft, said second cam element including a second plurality of smoothly undulating, spherically directed lobes;
a precession link supported by said high-speed shaft for rotation thereabout on a skew axis, which is angularly displaced from said main axis and which intersects said main axis at a point P;
a third cam element associated with the precession link, said third cam element including a third plurality of smoothly-undulating, spherically directed lobes;
a fourth cam element associated with the precession element, said fourth cam element including a fourth plurality of smoothly-undulating, spherically directed lobes;
a first cam follower element which includes a first plurality of rollers;
a second cam follower element which includes a second plurality of rollers;
wherein said first cam follower element, said first cam element and said third cam element are disposed so that each roller of said first plurality of rollers simultaneously and continuously contacts said first and third cam elements along the surface of a first sphere having its center at the point P; and
said second cam follower element, said second cam element and said fourth cam element are disposed so that each roller of said second plurality of rollers simultaneously and continuously contacts said second and fourth cam elements along the surface of a second sphere having its center at the point P.

* * * * *